United States Patent [19]
Moore

[11] 4,105,420
[45] Aug. 8, 1978

[54] CANISTER VACUUM CLEANER WITH TRANSPARENT LID

[75] Inventor: Barnard J. Moore, Venice, Fla.

[73] Assignee: Bayfront Carpet and Vacuum, Inc., Venice, Fla.

[21] Appl. No.: 799,698

[22] Filed: May 23, 1977

[51] Int. Cl.² .......................................... B01D 46/00
[52] U.S. Cl. .................................... 55/274; 55/373; 55/467; 285/7
[58] Field of Search ................ 55/274, 357, DIG. 34, 55/373, 467, 472; 15/327 A–327 F, 327 R; 285/7

[56] References Cited
U.S. PATENT DOCUMENTS

| | | |
|---|---|---|
| 1,064,412 | 6/1913 | White .................................... 55/274 |
| 2,008,067 | 7/1935 | Faber .................................... 55/467 |
| 2,537,205 | 1/1951 | Burmerster ............................ 55/373 |
| 2,745,682 | 5/1956 | Chevallier ............................ 285/276 |
| 3,101,889 | 8/1963 | Tatge .................................. 15/327 D |
| 3,383,839 | 5/1968 | Hintermaier ........................... 55/274 |

*Primary Examiner*—Bernard Nozick
*Attorney, Agent, or Firm*—Hauke and Patalidis

[57] ABSTRACT

A canister-type vacuum cleaner has a lid composed of transparent material. The lid has a central aperture through which a swivel member defining an air passageway protrudes. The swivel member is adapted for connection of an air hose and includes a handle which may be used to move the canister when the lid is latched in position on the canister and for moving only the lid when the lid is detached from the canister.

8 Claims, 2 Drawing Figures

CANISTER VACUUM CLEANER WITH TRANSPARENT LID

BACKGROUND OF THE INVENTION

Canister-type vacuum cleaners consist of a suction unit which is generally stationary during use of the cleaner. In addition to an electric motor for creating a suction force, the unit also includes a dust bag for filtering dust particles out of air drawn into the unit.

During use, the suction unit is attached to a head by means of an air hose. It is the head, which may be equipped with a rotatable brush, which draws dirt from the carpet or other object being cleaned and passes it through the hose to the suction unit where dirt particles are filtered from the air stream.

Most canister-type vacuum cleaners do not include a means for determining when the dust bag is full. As the dust bag gradually fills during use, the dust particles pile up to reduce the suction and thus the effectiveness of the cleaner. This reduced effectiveness occurs so slowly that the user of the cleaner is not aware of the reduction until a point is reached where the cleaner picks up so little dirt as to make it obvious that something is wrong. As a result the cleaner may be used for some time at a low level of effectiveness before it occurs to the user that the bag needs changing or to be emptied.

SUMMARY OF THE INVENTION

In the present invention, the body of a canister vacuum cleaner is equipped with a transparent lid which enables the dust collecting bag positioned in the canister body to be viewed at all times during use of the cleaner. Thus, the user may perceive when the bag is ready for emptying or for replacement by a fresh bag. Also the user may keep a periodical visual check on the particles and objects collecting in the bag.

Further objects and advantages of the present invention will become apparent to those skilled in the art when the following description of the best modes contemplated for practicing the invention is read in conjunction with the accompanying drawing wherein:

DETAILED DESCRIPTION OF THE PREFERRED EMBODIMENTS

Figure 2:
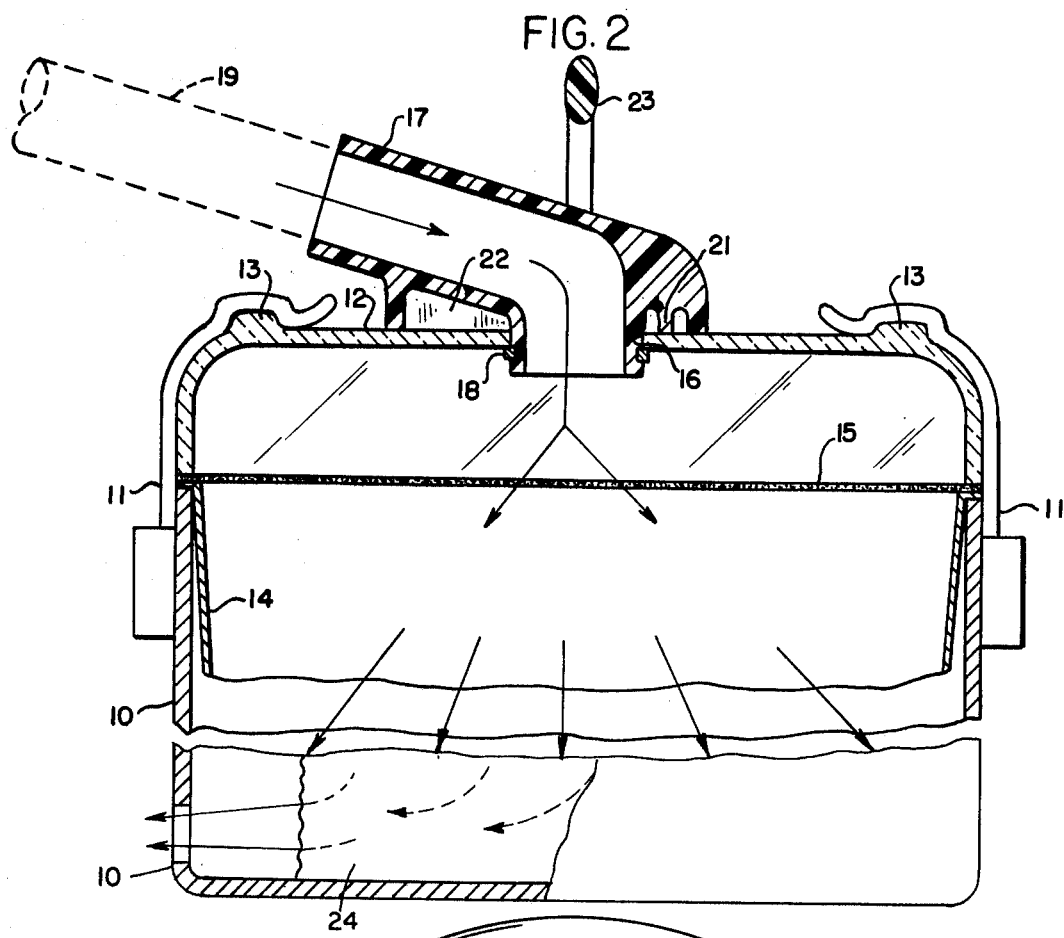
FIG. 2 is a broken partial sectional view of a canister-type vacuum cleaner taken along line 2—2 of FIG. 1.
Figure 1:
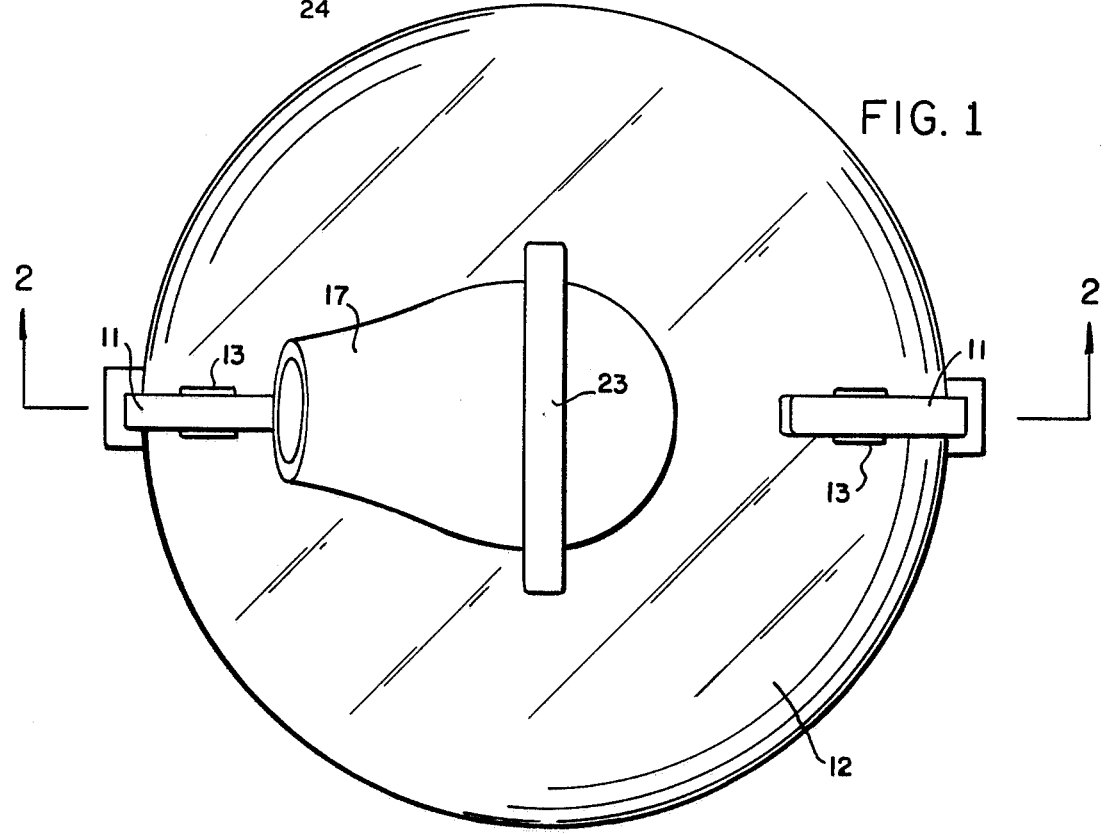
FIG. 1 is a top view of a transparent lid in accordance with the present invention.

Referring to the drawing, a canister body 10 FIG. 2, normally composed of a metallic material such as steel or aluminum has a pair of oppositely disposed spring latches 11 which serve to maintain the position a lid 12 by means of a pair of oppositely disposed integrally molded embossments 13 on the lid 12. The perimeter of the lid 12 is coated with a resilient material 15 (FIG. 2). A dust collecting bag 14 within the canister body 10 has its mouth edge positioned between the body 10 and the lid 12 where it is held by clamping action between these two members as a result of the spring bias of the latches 11. The resilient material 15 aids in maintaining the bag 14 in position.

The transparent material of the lid 12 may be any material which has sufficient rigidity and impact resistance. While glass is a satisfactory material, its brittleness makes it subject to breakage. Organic polymers are preferable because of their better impact resistance although their abrasion resistance is not as good as glass. Such organic polymers as methyl methacrylate polymer, polyester, nylon, polycarbonate, and others are satisfactory for use in this invention. The lid 12 may be molded in a conventional manner from any of these materials and others as well.

The lid 12 has a central aperture 16 through which a swivel top member 17 projects. A split steel ring 18 serves to maintain the swivel member 17 in position within the central aperture 16. The swivel member 17 is preferably a molding composed of organic polymeric material. As best shown in FIG. 2, the member 17 includes a circular rib 21 and a plurality of radial ribs 22 for reinforcement purposes. The ribs 21 and 22 cooperate with the split steel ring 18 in positioning the swivel member 17 in the lid 12. A handle 23 positioned on the swivel member 17, as shown, or alternately mounted on the lid 12, enables the canister and lid assembly to be moved easily when the lid is latched to the canister body 10 and enables the lid to be handled easily when it is detached from the body 10. The exterior end of the swivel member 17 is adapted for connection of a flexible hose member 19.

During use, a head member (not shown) is connected to the hose 19 and the conventional suction means 24 (not shown) within the canister body 10 is energized. As air incorporating dirt particles is pulled through the canister, the air flow being arbitrarily shown by arrows at FIG. 2, the bag 14 filters out the dirt particles. The buildup of these dirt particles within the bag 14 can be readily observed through the transparent lid 12. The lid 12 picks up very few of the particles and consequently the buildup within the bag 14 is not seriously obscured during use of the cleaner.

Having thus described the present invention by way of a typical structural embodiment thereof, modifications whereof will be readily apparent to those skilled in the art, what is claimed as new is as follows:

1. A canister-type vacuum cleaner comprising: a metallic canister body having an opening, a porous bag for filtering dirt particles out of air drawn into said canister body through said opening, means for applying suction to draw air through said bag, a removable lid closing said canister body by being removably mounted over said opening, said lid being entirely made of transparent material, a central aperture disposed in said lid, a sweivel member defining an air passageway into said porous bag disposed in said central aperture, and oppositely disposed embossments in said lid cooperating with oppositely disposed latches on said canister body to removably maintain said lid in air-tight attachment to said canister body with the edge of said porous bag clamped between the edges of said lid and said body opening.

2. A vacuum cleaner as claimed in claim 1 in which the lid is composed of polycarbonate.

3. A vacuum cleaner as claimed in claim 1 in which the lid is composed of glass.

4. A vacuum cleaner as claimed in claim 1 in which the lid has a centrally positioned handle.

5. A vacuum cleaner as claimed in claim 1 in which the canister and lid are of circular configuration and the lid is composed of an organic polymer.

6. A vacuum cleaner as claimed in claim 5 in which the organic polymer is methyl methacrylate polymer.

7. A vacuum cleaner as claimed in claim 5 in which the organic polymer is a polyester.

8. A vacuum cleaner as claimed in claim 5 in which the organic polymer is nylon.

* * * * *